United States Patent
Becker et al.

(10) Patent No.: US 10,591,755 B2
(45) Date of Patent: Mar. 17, 2020

(54) DIRECT-DRIVE POLYMER MODULATOR METHODS OF FABRICATING AND MATERIALS THEREFOR

(71) Applicant: Lightwave Logic Inc., Longmont, CO (US)

(72) Inventors: Richard Becker, Cupertino, CA (US); Frederick J Leonberger, Sarasota, FL (US); Michael Lebby, San Francisco, CA (US)

(73) Assignee: Lightwave Logic Inc., Englewood, CO (US)

(*) Notice: Subject to any disclaimer, the term of this patent is extended or adjusted under 35 U.S.C. 154(b) by 0 days.

(21) Appl. No.: 15/899,312

(22) Filed: Feb. 19, 2018

(65) Prior Publication Data
US 2018/0259798 A1  Sep. 13, 2018

Related U.S. Application Data

(60) Provisional application No. 62/468,157, filed on Mar. 7, 2017.

(51) Int. Cl.
*G02F 1/065* (2006.01)
*G02F 1/225* (2006.01)
*G02F 1/21* (2006.01)

(52) U.S. Cl.
CPC .............. *G02F 1/065* (2013.01); *G02F 1/225* (2013.01); *G02F 2001/212* (2013.01); *G02F 2201/063* (2013.01); *G02F 2202/022* (2013.01)

(58) Field of Classification Search
None
See application file for complete search history.

(56) References Cited

U.S. PATENT DOCUMENTS

| | | | | |
|---|---|---|---|---|
| 6,031,945 A | * | 2/2000 | You ...................... | G02B 6/1221 385/130 |
| 6,067,387 A | * | 5/2000 | Oh .......................... | G02F 1/065 385/2 |
| 6,558,585 B1 | * | 5/2003 | Zhang ..................... | G02F 1/065 205/122 |

\* cited by examiner

*Primary Examiner* — Michelle R Connelly
(74) *Attorney, Agent, or Firm* — Parsons & Goltry; Robert A. Parsons; Michael W. Goltry

(57) ABSTRACT

A direct-drive polymer modulator including a platform, a multilayer waveguide formed in/on the platform, the waveguide including a bottom cladding layer, an electro-optic polymer core and a top cladding layer, and at least a portion of the waveguide forming a direct-drive polymer modulator.

20 Claims, 13 Drawing Sheets

SINGLE-LAYER

TEMPERATURE ≅ $T_g$

- STRAIGHTFOWARD POLING
  - NO VOLTAGE DIVISION
  - $V_{CORE} = V_{POLE}$

3-LAYER MODULATOR STACK

- PROBLEMATIC POLING
  - VOLTAGE DIVISION
  - $V_{CORE} \ll V_{POLE}$ $$V_{Core} = V_{POLE} \times \frac{R_{Core}}{R_{Core} + R_{Clad} + R_{Clad}}$$

$\sigma$ = CONDUCTIVITY $$\text{RESISTANCE} = \frac{\text{LENGTH}}{\sigma \times \text{AREA}}$$

FOR $V_{Core} \cong V_{Pole}$ $\sigma_{Clad} \gg \sigma_{Core}$

MATERIAL RESISTIVITY
| MATERERIAL | RESISTIVITY AT Tg |
|---|---|
| LWL CORE MATERIAL | $2.62 \times 10^8$ Ω-cm |
| CLADDING PI2555 | $7.5 \times 10^{12}$ Ω-cm |
| CLADDING AL3355 | $7.5 \times 10^{12}$ Ω-cm |
| CLADDING UDEL | $1.2 \times 10^{11}$ Ω-cm |
| CLADDING UV15 | $\sim 10^9$ Ω-cm |
FIG. 3
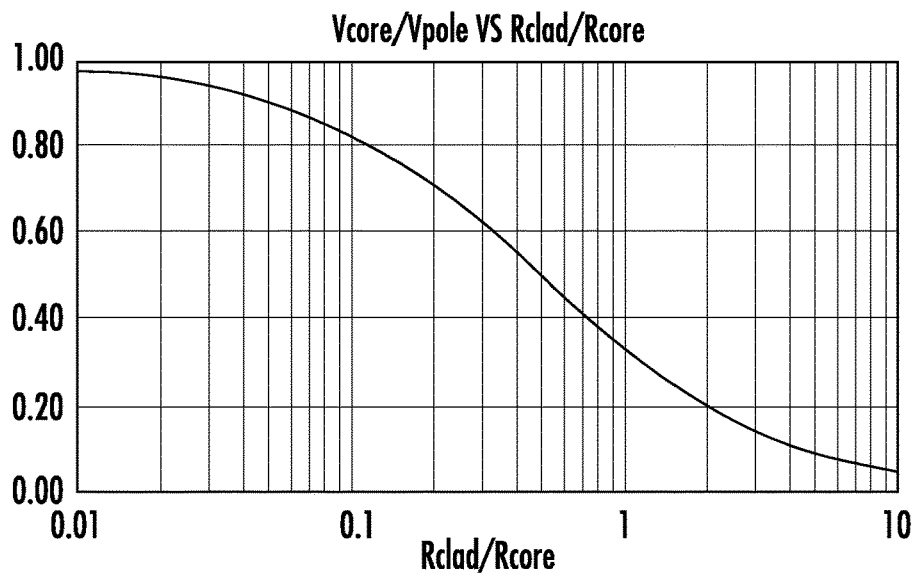
FIG. 4
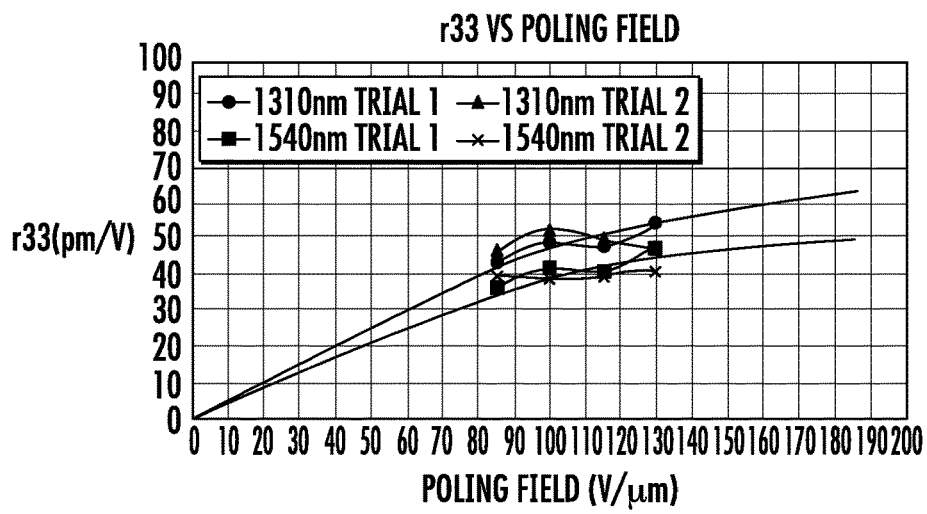
FIG. 5

TABLE 1

| MATERIAL/ APPROACH | WAVELENGTH λ(m) | THICKNESS D(m) | REFLECTIVE INDEX n | EO COEFFICIENT $r_{33}$ (pm/V) | LENGTH L(m) |
|---|---|---|---|---|---|
| STRAWMAN SI SLOT | 1.30E-06 | 1.20E-07 | 1.7 | 1.7 | 1.00E-03 |
| #1 3-LAYER | 1.30E-06 | 6.60E-06 | 1.705 | 1.705 | 6.90E-03 |
| #2 3-LAYER | 1.30E-06 | 6.60E-06 | 1.705 | 1.705 | 8.60E-03 |
| LWL 3-LAYER | 1.30E-06 | 6.60E-06 | 1.72 | 1.72 | 5.00E-03 |
| LN X-CUT | 1.30E-06 | 1.00E-05 | 2.2 | 2.2 | 8.00E-02 |

| OVERLAP Γ | $V_\pi$ | VOLTAGE-LENGTH PRODUCT $V_\pi$-L (V-mm) | $n^3 r$ FACTOR $n^3 r_{33}$ (pm/V) | ISSUES | COMMENTS |
|---|---|---|---|---|---|
| 0.2 | 0.50 | 0.99 | 393 | HIGH LOSS | |
| 1 | 0.50 | 3.46 | 1239 | | $V_\pi = (\lambda \cdot D)/(2 \cdot n^3 \cdot R_{33} \cdot L \cdot \Gamma)$ (PUSH-PULL) |
| 1 | 0.50 | 4.33 | 991 | | ALL 3-LAYER MODULATORS REQUIRE $\sigma_{clad} = /> \sigma_{core}$ |
| 1 | 0.50 | 2.48 | 1730 | | |
| 0.5 | 0.50 | 39.64 | 328 | LENGTH | |

FIG. 6

RIDGE WAVEGUIDE

INVERTED RIDGE WAVEGUIDE

DIRECT-DRIVE POLYMER MODULATOR METHODS OF FABRICATING AND MATERIALS THEREFOR

CROSS-REFERENCE TO RELATED APPLICATION

This application claims the benefit of U.S. Provisional Patent Application No. 62/468,157, filed 7 Mar. 2017.

FIELD OF THE INVENTION

This invention relates to lasers and polymer modulators integrated on a common platform.

BACKGROUND OF THE INVENTION

Polymer modulators have become very popular in the current technology boom. Polymer photonics technology with customized core and cladding layers provides a number of significant advantages over the prior art. Among the many advantages, some of the most significant are that it allows efficient 3-layer modulators with high performance (multi GHz) and very-low voltage operation to allow direct-drive (DDPM) without the need for using a drive circuit. However, present day prior art 3-layer polymer modulators are not direct-drive modulators.

Much of the recent work on polymer modulators has been focused on Si-organic-hybrids (SOH) often referred to as Si slot modulators. These prior art modulators exhibit very small $V_n$-L products due to their short length (~1 mm) and high single-layer $r_{33}$ coefficients. Due to the fact that only an electro-optic (EO) polymer is used in the structure, the poling is efficient and the single-layer $r_{33}$ (value achieved in a Teng-Man measurement) is also achieved in the device. This is contrasted with a typical 3-layer modulator (cladding/core/cladding) where the poling is inefficient due to the voltage division among the three layers (see FIGS. 1 and 2 below). Typically, dielectric breakdown occurs in the cladding before complete poling can be accomplished in the core.

It would be highly advantageous, therefore, to remedy the foregoing and other deficiencies inherent in the prior art.

Accordingly, it is an object of the present invention to provide a new and improved direct-drive polymer modulator.

It is another object of the present invention to provide new and improved methods of fabricating direct-drive polymer modulators and materials therefor.

It is another object of the present invention to integrate the new and improved direct-drive polymer modulator on a common platform with a monolithic laser formed in/on the platform.

SUMMARY OF THE INVENTION

Briefly to achieve the desired objects and advantages of the instant invention in accordance with a preferred embodiment a direct-drive polymer modulator is provided. The direct-drive polymer modulator including a platform, a multilayer waveguide formed in/on the platform, the waveguide including a bottom cladding layer, an electro-optic polymer core and a top cladding layer, and at least a portion of the waveguide forming a direct-drive polymer modulator.

To further achieve the desired objects and advantages of the present invention a specific embodiment of a direct-drive polymer modulator includes a platform and a multilayer waveguide formed in/on the platform. The multilayer waveguide includes a bottom electro-optic polymer cladding layer, an electro-optic polymer core and a top electro-optic polymer cladding layer, the electro-optic polymer core having an electro-optic coefficient ($r_{33}$) greater than 250 pm/V, and a Tg 150° C. to >200° C., and the top and bottom electro-optic polymer cladding layers having a Tg approximately the same as the Tg of the electro-optic polymer core. A direct-drive electro-optic polymer modulator is formed in the multilayer waveguide.

To further achieve the desired objects and advantages of the present invention a specific embodiment of a method of fabricating a direct-drive polymer modulator includes the steps of providing a platform, depositing on the platform a bottom electro-optic polymer cladding layer, an electro-optic polymer core overlying the bottom electro-optic polymer cladding layer, and a top electro-optic polymer cladding layer overlying the electro-optic polymer core forming an electro-optic polymer waveguide. The step further includes forming the electro-optic polymer core from materials having an electro-optic coefficient ($r_{33}$) greater than 250 pm/V, a Tg 150° C. to >200° C. and a resistivity approximately $10^8$ Ohm-cm, and the top and bottom electro-optic polymer cladding layers have a Tg approximately the same as the Tg of the electro-optic polymer core, and a resistivity less than the resistivity of the electro-optic polymer core at the poling temperature, and the top and bottom electro-optic polymer cladding layers have levels of conductivity equal to or higher than the electro-optic polymer core. The method further includes forming an electro-optic direct-drive polymer modulator in the electro-optic polymer waveguide.

BRIEF DESCRIPTION OF THE DRAWINGS

Specific objects and advantages of the invention will become readily apparent to those skilled in the art from the following detailed description of a preferred embodiment thereof, taken in conjunction with the drawings in which:

FIG. 3 is a table listing materials and their resistivity at the glass transition temperature (Tg);

FIG. 4 is a graph illustrating the relationship of $V_{core}/V_{pole}$ VS $R_{clad}/R_{core}$;

FIG. 5 is a graph illustrating $r_{33}$ vs the poling field;

FIG. 6 illustrates Table 1 which includes various characteristics for maximizing the EO coefficient;

DETAILED DESCRIPTION OF THE DRAWINGS

A primary object of the present invention is to provide a new and improved direct-drive polymer modulator which can be integrated with lasers and/or other light sources, preferably on a common platform, with novel new designs and processes. In this context, the term "direct-drive polymer modulator" is defined as a modulator formed in a waveguide with at least an electro-optic polymer core and which does not require a driver circuit but can be driven directly. In the preferred embodiment, the common platform is InP, because lasers are naturally fabricated from InP and are already monolithic (part of the same material). It will be understood however, that the platform or substrate could be silicon, GaAs, metal, plastic, or any other suitable organic or inorganic material.

One specific method or concept for the formation of a direct-drive polymer modulator in accordance with the present invention, is to provide a platform/substrate. Electro-optic polymer waveguides are formed using a 3-layer structure, e.g. lower cladding layer, core, and upper cladding layer. The cladding layers are sufficiently thick so that negligible light leaks to the substrate. A laser or other light source can be coupled to an input of the waveguide and output light from the waveguide can be coupled to an output optical fiber. Alternatively, the modulator output can be coupled to a glass or nitride guide and directed to a waveguide mux (that can also be formed in the same material).

Figure 1A:
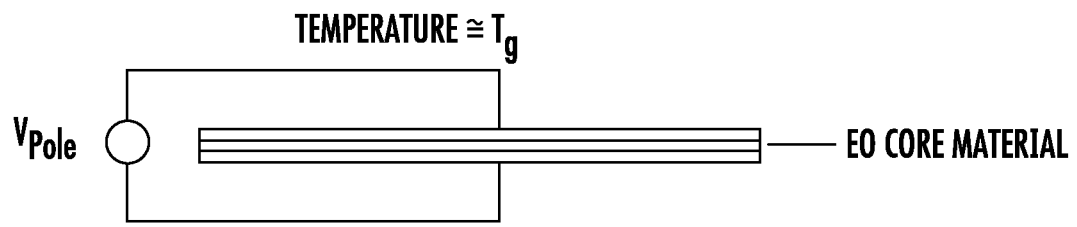
FIGS. 1A and 1B illustrate a concept of optimized polymer modulator poling with a single resistance layer in physical and schematic views, respectively.
Figure 1B:
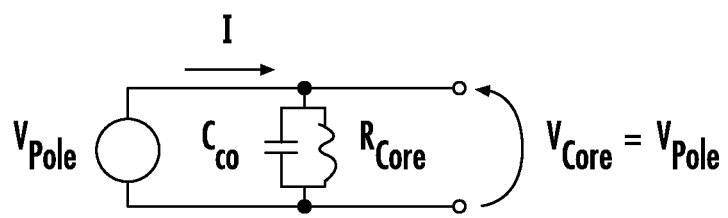
Figure 2A:
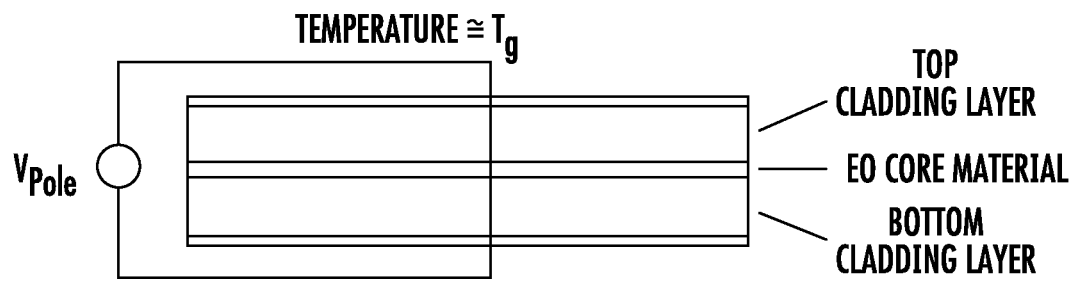
FIGS. 2A and 2B illustrate a concept of optimized polymer modulator poling in a three layer stack with matched resistance layers in physical and schematic views, respectively.
Figure 2B:
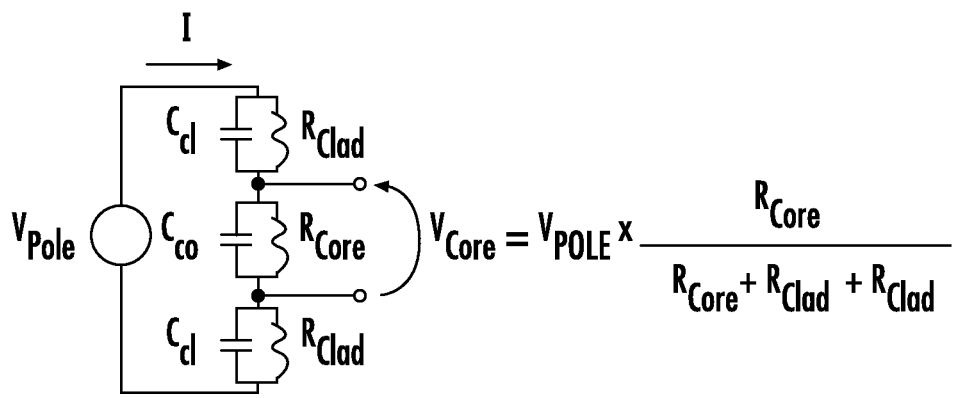

Referring to polymer modulators, it is understood in the art, before poling of a polymer the chromophores with a permanent dipole are randomly oriented. Poling consists of heating the polymer to a temperature near the glass transition temperature (Tg) of the material and applying an electric field to align the chromophores (or a substantial quantity of them). As is also understood, properly poling a polymer is a major determinate of some characteristics, such as the EO coefficient, of the material. Referring to FIGS. 1A and 1B, it can be seen that poling a single layer of polymer material (e.g. a core) is relatively straightforward, since the poling voltage is equal to the voltage applied across the core or single layer. Referring additionally to FIGS. 2A and 2B, it can be seen that once upper and lower matched cladding layers are formed with the core (e.g. a 3-layer modulator stack) the poling becomes more complex because of the voltage division between the core and the cladding layers. As described, when $V_{core}$ is approximately equal to $V_{pole}$ the eo coefficient ($r_{33}$) is maximized and the resulting drive voltage for the waveguide is minimized. Further, it can be determined from FIG. 2B and the included equation that $V_{core}$ is approximately equal to $V_{pole}$ when the conductivity of the cladding layers ($\sigma_{clad}$) is much greater than the conductivity of the core ($\sigma_{core}$).

Turning now to FIG. 3, the chart illustrates the resistivity of some typical polymer core and cladding materials. Usual polymer lower cladding materials may include commercially available polymers such as: UV/thermal cure types; OC-3021 from Dymax, CO-160 from ChemOptics, Level M10-44 from Brewer Science, AL-3355 from FOC, NOA61 from Norland; as well as Epoxies from DOW, Epoxylite; as well as Thermoplastics such as UDEL from Solvay, PI2555 from HD Microsystems, Matrimid 5218 from Huntsman, Polysulfone from Aldrich etc. The examples show that core materials have a much smaller resistivity than cladding materials. Further, from the graphs illustrated in FIGS. 4 and 5 it can be determined that a smaller $V_{core}$ results in a smaller $r_{33}$ and a smaller $r_{33}$ results in a larger required modulator drive voltage.

At the present time, there are commercially-available EO polymers that exhibit very large $r_{33}$ values, but the lack of a cladding material with the correct properties makes it difficult to efficiently pole these large $r_{33}$-value EO polymers. Many commercially available EO polymers have a low $T_g$, making them unsuitable for typical Polymer photonics applications. None have engineered the conductivity of the cladding materials to solve this problem. In summary, a large $r_{33}$ and high $T_g$ are needed.

Referring additionally to Table 1 in FIG. 6, some characteristics for maximizing the EO coefficient are listed in the form of modeled modular approaches. In Table 1, the 'length' refers to the active electrode length and the 'overlap' is the overlap factor for the applied and optical fields. For a 3-layer microstrip configuration, the overlap is approximately 1. The 'Strawman Si' slot provides the shortest length modulator but currently has excessive optical loss. Table 1 provides the specification to achieve $V_\pi=0.5V$ and a high EO coefficient for the core ($r_{33}>250$ pm/V). For cladding with conductivity much larger than that of the core material at its poling temperature, the active electrode length would be approximately 7 mm for a $V_\pi=0.5V$ using the #1 3-layer material approach.

Some important criteria for cladding materials suitable for use in the novel direct-drive polymer modulator are as follows. A refractive index of the cladding material at 1550 nm equal to the core refractive index minus approximately 0.05. A coefficient of thermal expansion (CTE) of the cladding material as close to the CTE of the core materials as possible. A $T_g$ of the cladding material near the $T_g$ of the core (i.e. 150° C. to >250° C.). A resistivity of the cladding material at room temperature greater than approximately $10^8$ Ohm-cm. A resistivity of the cladding material at the poling temperature (~$T_g$) much less than the core resistivity (less than approximately $10^8$ Ohm-cm). An optical loss through the cladding layer less than 1 dB/cm of light at 1300 nm to 1600 nm. A dielectric loss tangent less than 0.002 at 10 GHz. A cladding material that is not chemically attacked by the core, core solvents, or photoresist solvents. A cladding material that forms an adhesive bond with Au, Ti/Au, or Cr/Au metallization and with the core. A cladding material that is dry-etchable with reasonable etch rates. A cladding material with endfaces that can be polished, cleaved, or direct cut. A cladding material that forms a hermetic seal or is at least $O_2$ blocking.

Some cladding materials that are suitable for use in the present novel direct-drive polymer modulator are as follows: ionically-doped polyimides and epoxies; colloidal-metal-doped polyimides; sulfonic acid-doped polyimides (dopants for various cladding polymers may include metal or organic trifles, such as triflic acid esters, or triflamides; and inorganic metal oxides, nitrides, etc, that can be vacuum deposited by evaporation or sputtering, or epitaxy (formation can include molecular beam epitaxy, metal organic chemical vapor deposition, or atomic layer epitaxy). Materials such as: Cladding P12555; Cladding AL3355; Cladding UDEL; Cladding UV15; and others can be used in the present invention, by doping the materials to lower their resistivity.

Figure 7A:
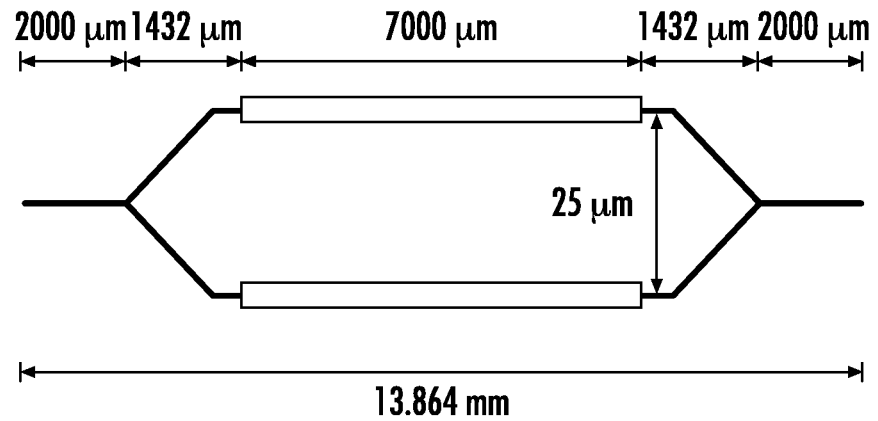
FIGS. 7A and 7B illustrate two examples of polymer Mach-Zehnder modulators with Y-splitters/combiners and with MMI splitters/combiners, respectively.
Figure 7B:
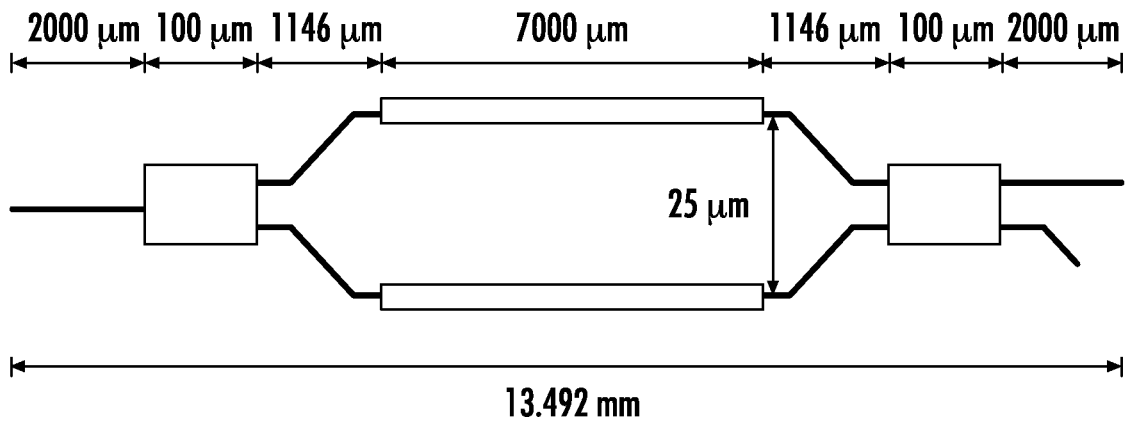

Turning to FIGS. 7A and 7B, typical Mach-Zehnder modulator layouts are illustrated. In FIG. 7A, Y-splitters/combiners are attached to a Mach-Zehnder type modulator and in FIG. 7B MMI (multimode interference) splitters/combiners are attached to the Mach-Zehnder type modulator in place of the Y-splitters/combiners. In FIG. 7A, the input waveguide is 2000 um long, the input Y-splitter is 1432 um long, the Mach-Zehnder interferometer legs are 7000 um long, the output Y-splitter is 1432 um long, and the output waveguide is 2000 um long, for a total of 13,864 mm long. In FIG. 7B, the input waveguide is 2000 um long, the input MMI splitter is 100 um long with connecting legs 1146 um long, the Mach-Zehnder interferometer legs are 7000 um long, the output mmi splitter is 100 um long with connecting legs 1146 um long, and the output waveguide is 2000 um long, for a total of 13,492 mm long. The standard Mach-Zehnder modulator also has 'overhead' length in addition to the active (electrode) length, which for the embodiment of FIG. 7B amounts to approximately 6.5 mm. Benefits of these structures are that the full length of the modulator is approximately 13.5 mm and as understood in the art, the length is important for packaging. For Mach-Zehnder modulator designs of this type, the higher the EO coefficient, $r_{33}$, the shorter the device length. For this type of device to be useful, the waveguide loss is preferably reduced to <2.2 dB/cm, assuming 1.5 dB coupling loss per end can be achieved, and a total insertion loss of 6 dB is acceptable. With an rf design, the performance at these levels is >50 GHz. The very big advantage and key aspect of the present invention is that external rf drivers are not required.

Figure 8A:
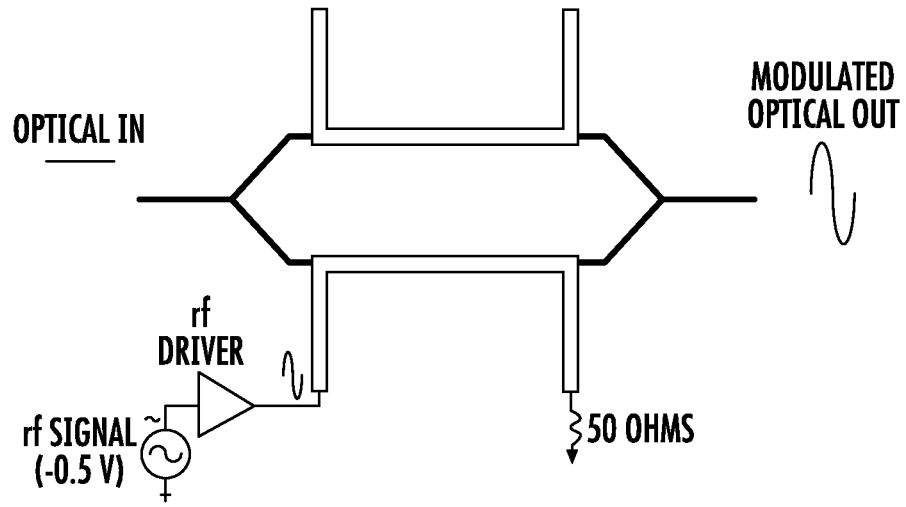
FIGS. 8A and 8B illustrate prior art polymer modulators using rf drivers with Mach-Zehnder modulators with Y-splitters/combiners and with MMI splitters/combiners, respectively.
Figure 8B:
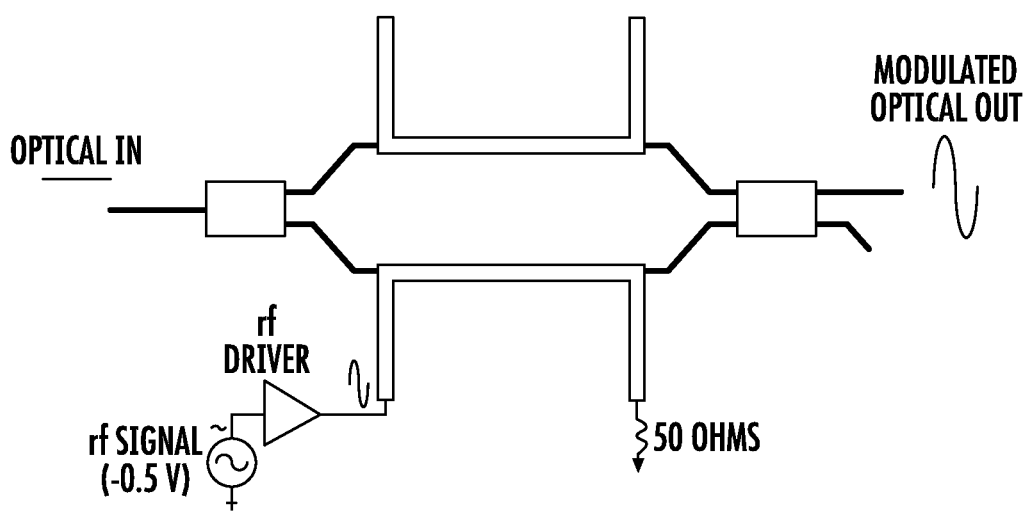
Figure 9A:
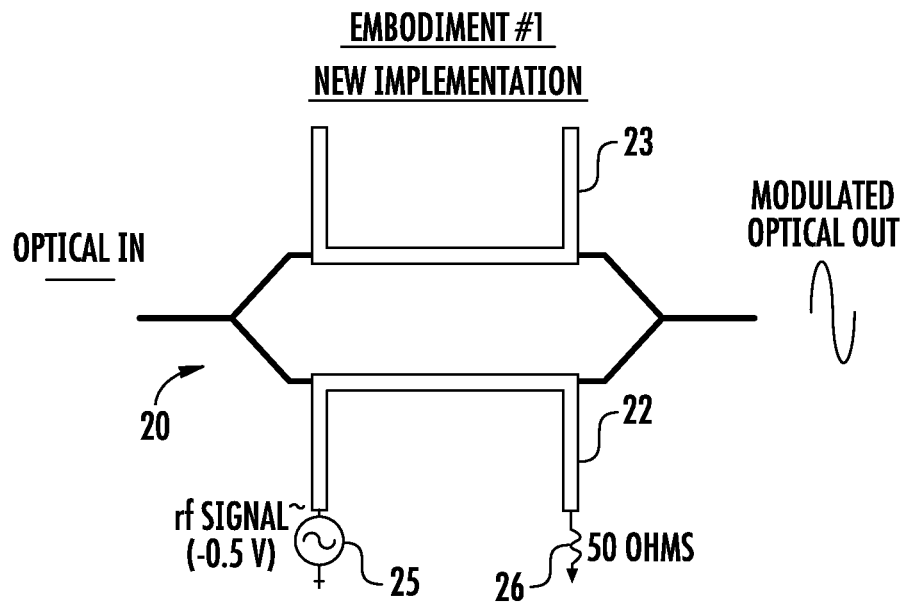
FIGS. 9A and 9B illustrate polymer modulators using direct-drive signals (no rf drivers) with Mach-Zehnder modulators with Y-splitters/combiners and with MMI splitters/combiners, respectively.
Figure 9B:
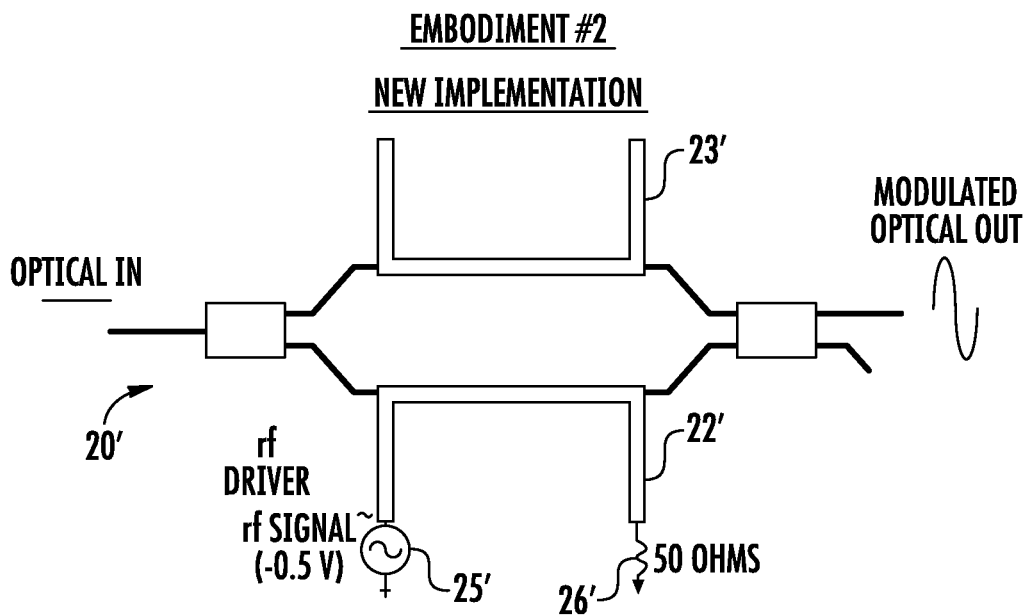

Turning now to FIGS. 8A and 8B, prior art Mach-Zehnder type modulators with Y-splitters/combiners attached and with MMI splitters/combiners attached, respectively, are illustrated. Input or modulating signals are applied to the modulators by means of U-shaped electrodes overlying each arm of the Mach-Zehnder modulator in a well-known manner. In these prior art examples rf modulating signals (set at approximately 0.5V in this example) are applied to the electrodes by way of rf drivers connected to one end of one of the U-shaped electrodes, the other end being connected through a 50-ohm termination to ground. It will of course be understood that the driver adds substantial cost, size, complexity, DC power, heat dissipation, etc. to any packaging of the modulator Referring additionally to FIGS. 9A and 9B, Mach-Zehnder-type modulators, fabricated in accordance with the present invention, with Y-splitters/combiners attached, designated 20, and with MMI splitters/combiners attached, designated 20', respectively, are illustrated. Input or modulating signals are applied to each of modulators 20 and 20' by means of U-shaped electrodes, 22 and 23 for modulator 20 and 22' and 23' for modulator 20', overlying each arm of the Mach-Zehnder modulator. In accordance with the present invention, an rf modulation signal 25 of approximately 0.5V, and generally in a range of 0.2V to 0.5V, is applied directly to one end of U-shaped electrode 22 and the other end is connected through a 50 ohm termination 26 to ground. Similarly, an rf modulation signal 25' of approximately 0.5V is applied directly to one end of U-shaped electrode 22' and the other end is connected through a 50-ohm termination 26' to ground. Thus, two examples of direct-drive polymer modulators (DDPM) are illustrated in FIGS. 9A and 9B. In this preferred embodiment, each of modulators 20 and 20' use an EO polymer with an $r_{33}$>250 pm/V and generally in a range of 250 pm/V to 750 pm/V. Also, modulators 20 and 20' include at least 3-layer waveguides with customized cladding layers having relatively high conductivity (see explanation above) which allows the DDPM waveguides to be optimally poled. Further, the waveguides have propagation losses less than 2.2 dB/cm and insertion losses less than 6 dB. Suitable EO polymers are commercially available and include, for example, the nonlinear optical chromophores described in U.S. Pat. Pub. Nos. US2009/0005561, US2007/0260063, US2008/0139812, US 2007/0260062 and US 2012/0267583, the entire contents of which are incorporated herein by reference.

Figure 10A:
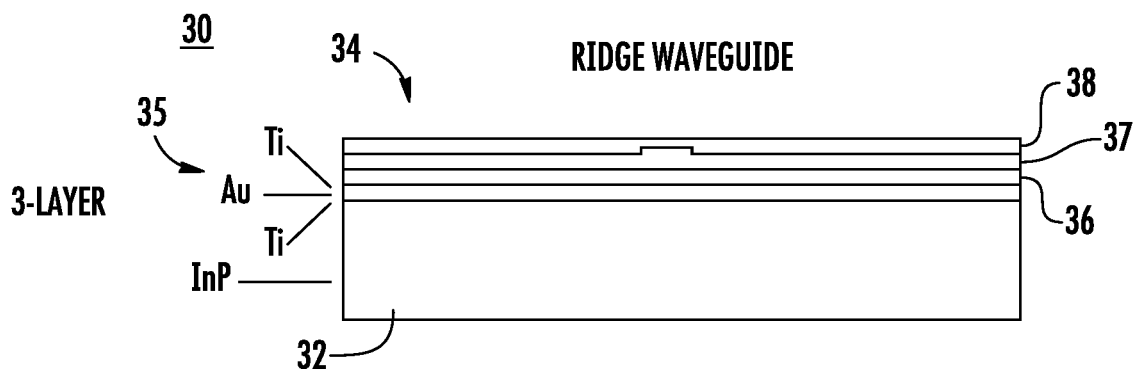
FIGS. 10A, 10B, and 10C illustrate a method of fabricating a polymer modulator using a ridge waveguide with 3-layer stack, 4-layer stack, and 5-layer stack, respectively, on an InP platform, in accordance with the present invention.

Turning now to FIG. 10A, a specific example of a 3-layer polymer modulator/waveguide 30 in accordance with the present invention is illustrated. Modulator/waveguide 30 includes an InP platform/substrate 32 with a ridge waveguide 34 monolithically formed thereon. It should be understood that substrate 32 could be silicon or any other semiconductor material and the InP is simply for purposes of example. Waveguide 34 may be fabricated using any convenient method for the specific application. In this specific example the first material deposited on the InP surface is a metallization 35, such as Au, Ti/Au, or Cr/Au, in this example sequential layers of Ti/Au/Ti are deposited. A bottom cladding layer 36 is deposited on metallization 35, a core 37 with upwardly directed ridge is deposited on bottom cladding layer 36, and a top cladding layer 38 is deposited on core 37. Modulator/waveguide 30 is referred to as a "ridge waveguide". The modulator generally includes coplanar electrodes for poling and modulation unless a metal layer is deposited on the InP substrate below the polymer layers, hence metallization 35.

In this and the following examples, the material for cladding layers 36 and 38 is selected to have the following characteristics. The refractive index of the cladding material at 1550 nm is equal to the refractive index of the material of core 37 minus approximately 0.05. The coefficient of thermal expansion (CTE) of the cladding material is as close to the CTE of the material of core 37 as possible. The Tg of the cladding material is near the Tg of the core material (generally 150° C. to >200° C.). The resistivity of the cladding material, at room temperature, is greater than approximately $10^8$ Ohm-cm. The resistivity of the cladding material, at poling temperature (~Tg), is much less than the resistivity of the core material (<~$10^8$ Ohm-cm). The optical loss of the cladding material is less than 1 dB/cm from 1300 nm to 1600 nm. The dielectric loss tangent of the cladding material is less than 0.002 at 10 GHz. The cladding material is not chemically attacked by the core material, core material solvents, or photoresist solvents. The cladding material forms an adhesive bond with Au, Ti/Au, or Cr/Au metallization and with the core material. In addition, the cladding material must be dry etchable with reasonable etch rates, the endfaces must be able to be polished, cleaved, or direct cut, and it must provide a hermetic or at least an $O_2$ block.

Figure 10B:
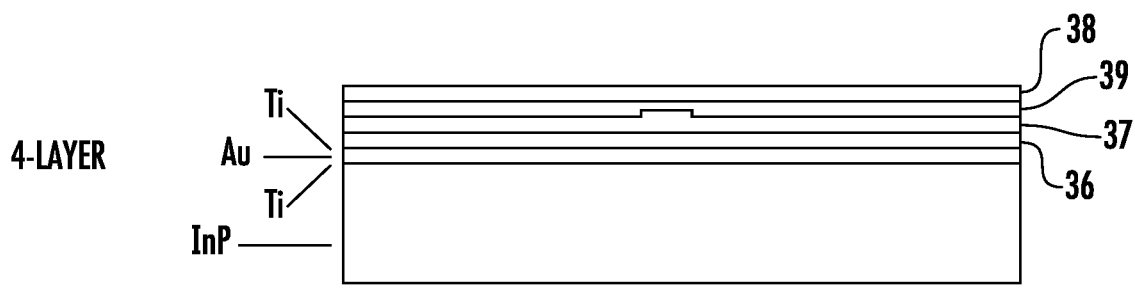
Figure 10C:
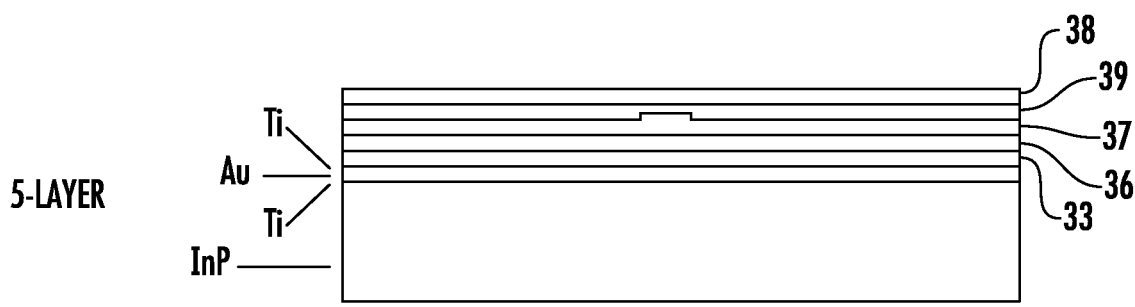

Referring additionally to FIGS. 10B and 10C, 4 and 5 layer ridge waveguides are illustrated, respectively. The 4-layer ridge waveguide illustrated in FIG. 10B is basically the same as the 3-layer ridge waveguide illustrated in FIG. 10A, except that an additional cladding layer 39 is deposited on the upper surface of core layer 37. The 5-layer ridge waveguide illustrated in FIG. 10C is basically the same as the 4-layer ridge waveguide illustrated in FIG. 10B, except that an additional cladding layer 33 is deposited on the bottom cladding layer 36, i.e. between core layer 37 and the previous bottom cladding layer 36. Additional cladding layers 39 and/or 33 may be added to enhance the characteristics of the cladding layers, allow the selection of a wider range of materials, further enhance the operation, etc.

Figure 11A:
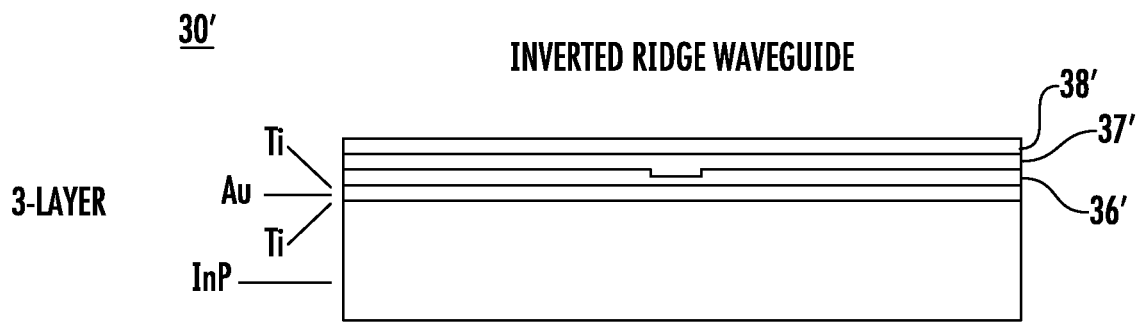
FIGS. 11A, 11B, and 11C illustrate method of fabricating a polymer modulator using an inverted-ridge waveguide with 3-layer stack, 4-layer stack, and 5-layer stack, respectively, on an InP platform, in accordance with the present invention.
Figure 11B:
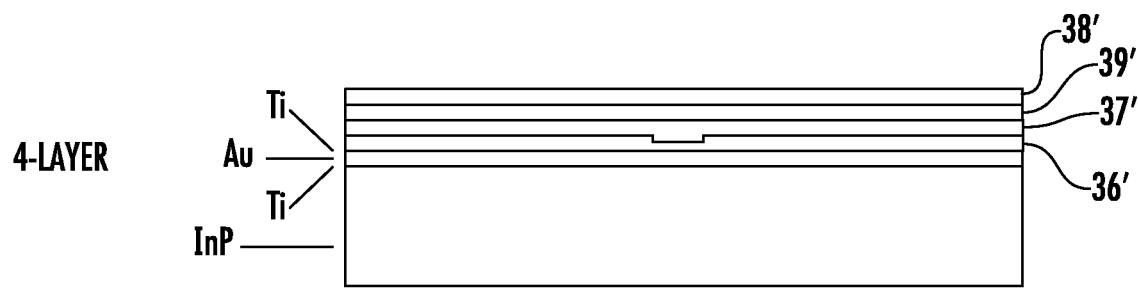
Figure 11C:
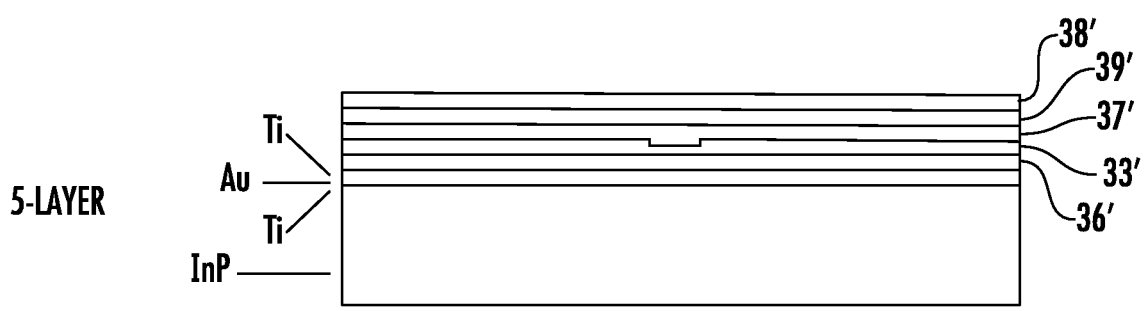

A modulator/waveguide 30' is illustrated in FIG. 11A, which is the same as modulator/waveguide 30 of FIG. 10A except that an inverted ridge and core are included. Modulator/waveguide 30' is referred to as an "inverted ridge waveguide". Referring additionally to FIGS. 11B and 11C, 4 and 5 layer inverted-ridge waveguides are illustrated, respectively. The 4-layer inverted-ridge waveguide illustrated in FIG. 11B is basically the same as the 3-layer inverted-ridge waveguide illustrated in FIG. 11A, except that an additional cladding layer 39' is deposited on the upper surface of core layer 37'. The 5-layer inverted-ridge waveguide illustrated in FIG. 11C is basically the same as the 4-layer inverted-ridge waveguide illustrated in FIG. 11B, except that an additional cladding layer 33' is deposited on the bottom cladding layer 36', i.e. between core layer 37' and the previous bottom cladding layer 36'. Additional cladding layers 39' and/or 33' may be added to enhance the characteristics of the cladding layers, allow the selection of a wider range of materials, further enhance the operation, etc.

Figure 12:
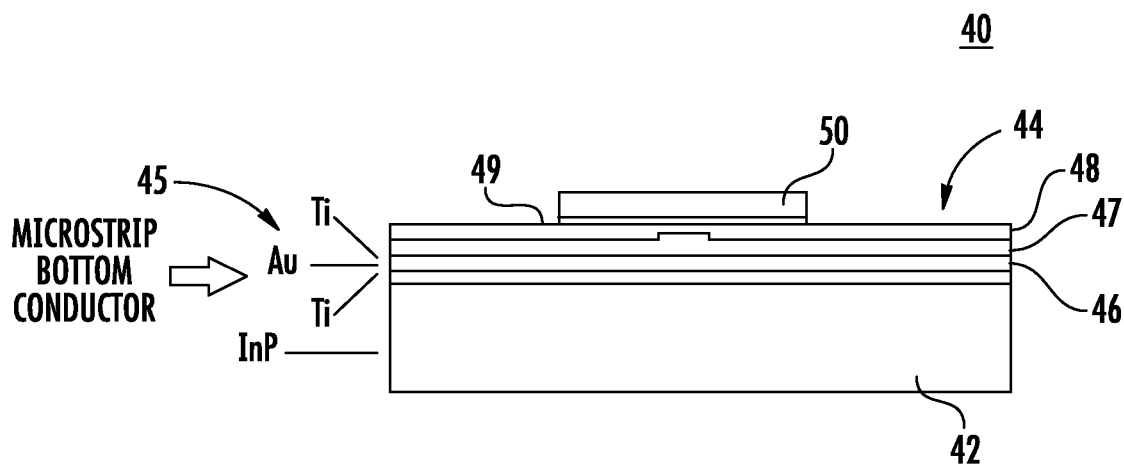
FIG. 12 illustrates a method of fabricating a polymer modulator using a ridge waveguide with 3-layer stack and bottom and top microstrip conductors on an InP platform, in accordance with the present invention.
Figure 13:
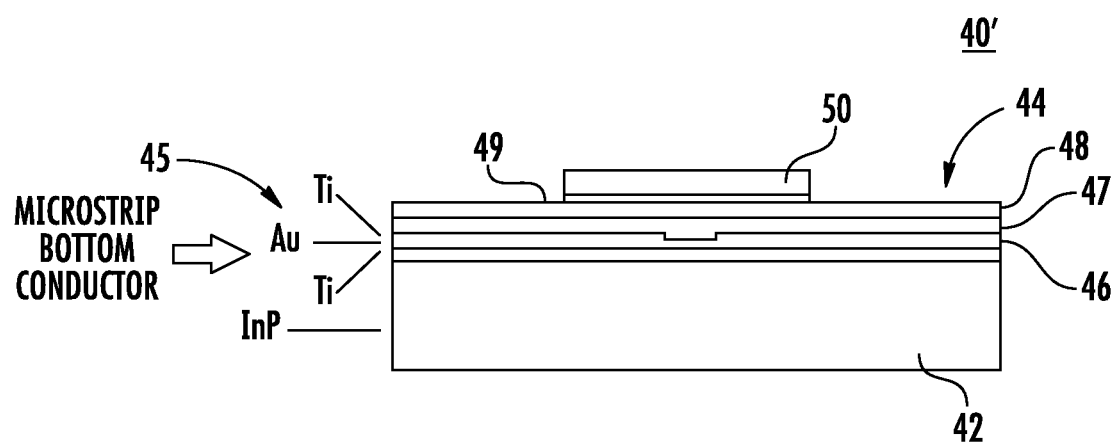
FIG. 13 illustrates a method of fabricating a polymer modulator using an inverted-ridge waveguide with 3-layer stack and bottom and top microstrip conductors on an InP platform, in accordance with the present invention.

Turning now to FIG. 12, a direct-drive polymer modulator (DDPM) 40 is illustrated in accordance with the present invention. DDPM 40 includes a 3-layer stack forming a ridge waveguide similar to the example illustrated in FIG. 10A with an InP platform/substrate 42 having a ridge waveguide 44 monolithically formed thereon. Ridge waveguide 44 may be fabricated using any convenient method for the specific application. In this specific example, the first material deposited on the InP surface is a metallization 45, such as Au, Ti/Au, or Cr/Au, in this example sequential layers of Ti/Au/Ti are deposited. A bottom cladding layer 46 is deposited on metallization 45, a core 47 with upwardly directed ridge is deposited on bottom cladding layer 46, and a top cladding layer 48 is deposited on core 47. An electron blocking layer 49 is deposited on the upper surface of top cladding layer 48 above the ridge formed in the core 47 and a top microstrip conductor 50 is deposited on the upper surface of electron blocking layer 49. Electron blocking layers or charge barriers can be composed of thinly deposited metal oxides such as titanium oxide, spin on glasses such as PDMS, organic materials such as BCB, Organosilane compounds, as well as polyvinylcarbazole. These materials provide an electrical charge barrier to reduce leakage in the device. In this specific example, metallization 45 acts as a microstrip bottom conductor and top microstrip conductor 50 completes the microstrip input. Thus, a simple and inexpensive microstrip input is conveniently integrated into the present inventive direct-drive polymer modulator. Similarly, a direct-drive polymer modulator (DDPM) 40' with inverted-ridge waveguide and microstrip input is illustrated in FIG. 13.

Figure 14:
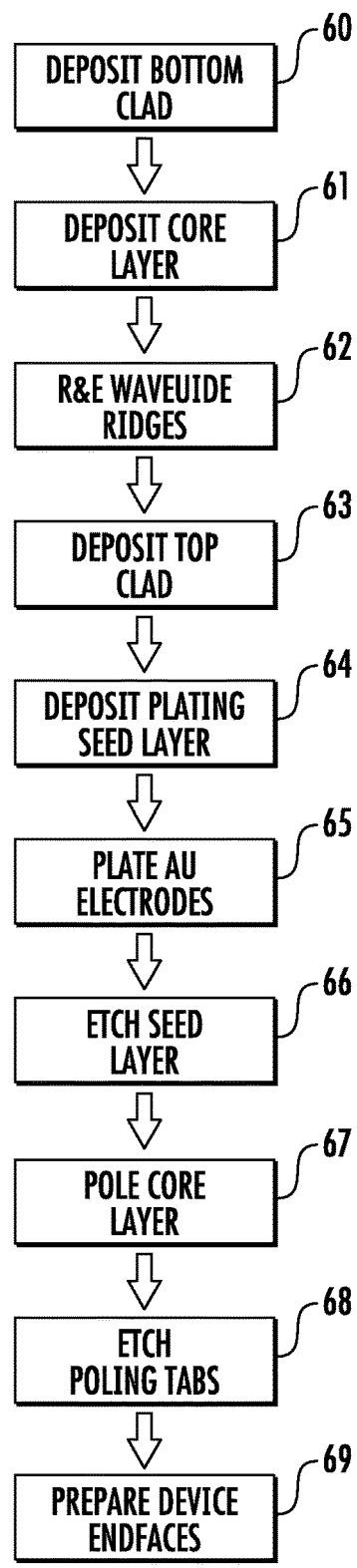
FIG. 14 illustrates steps in a method of fabricating direct-drive polymer modulators using a ridge waveguide 3-layer stack.

Referring additionally to FIG. 14, a flow chart is illustrated showing a preferred process for the fabrication of ridge waveguides, such as ridge waveguide 30 illustrated in FIG. 10A. The process starts with a platform/substrate having, in this preferred embodiment a trench formed for the deposition of the ridge waveguide. The trench may also have a metallization on the bottom surface, or not. Starting with these features, in a first step 60 a bottom cladding layer is deposited. In a second step 61 a core layer is deposited. A third step 62 includes forming waveguide ridges, which in this preferred example includes reactive ion etching. A fourth step 63 consist of depositing a top cladding layer. A seed layer is deposited on the upper surface of the structure, step five 64, and Au electrodes are plated on the seed layer, step six 65. The seed layer is etched to separate the Au electrodes, step seven 66, and the core is poled, step eight 67, using the Au electrodes to apply the proper field. In a step nine 68, the Au poling tab electrodes are removed by etching and in a final step 69 the waveguide is completed by preparing the endfaces as required by the specific type of device being fabricated.

Figure 15:
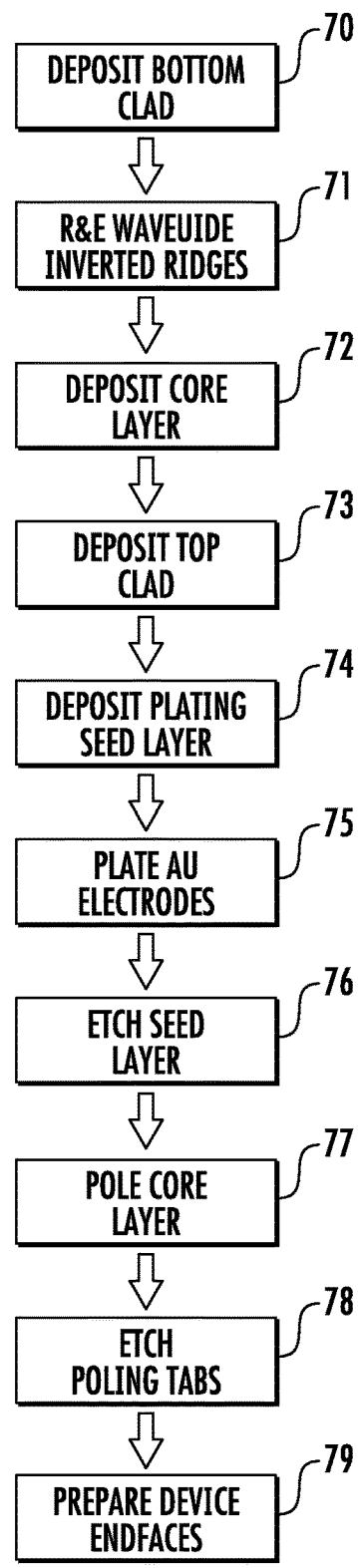
FIG. 15 illustrates steps in a method of fabricating direct-drive polymer modulators using an inverted-ridge waveguide 3-layer stack.

Referring additionally to FIG. 15, a flow chart is illustrated showing a preferred process for the fabrication of an inverted-ridge waveguides, such as ridge waveguide 30' illustrated in FIG. 11A. All of the steps in the process of fabricating an inverted-ridge waveguide are the same as those described above for a ridge waveguide, except that RIE waveguide inverted ridges are formed in the bottom cladding in a step preceding the deposition of the core layer.

Figure 16:
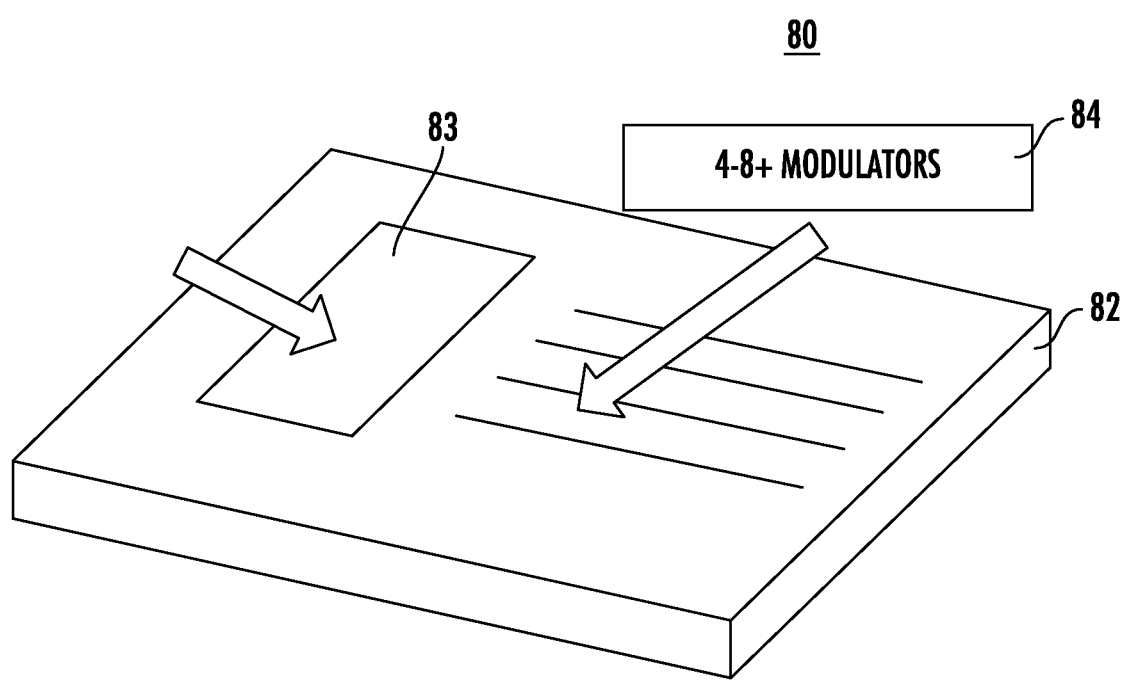
FIG. 16 is a simplified perspective view illustrating and array of lasers/polymer modulators on a semiconductor platform.

Referring now to FIG. 16, an example of multiple DDPM structure, designated 80, of the type described above are arrayed on a generic InP chip 82. The chip can be silicon based or an InP substrate may be deposited on the silicon and becomes the platform as used in the above descriptions. The various components may be fabricated in silicon or, as in this specific example the InP chip becomes the platform as used in the above descriptions. In the example illustrated, four monolithic lasers, designated 83, are formed in the InP platform/substrate. Four direct-drive polymer modulators 84 are formed in the InP platform/substrate in optical alignment with the four lasers. While four laser/polymer modulator sets are illustrated in this example, it will be understood that to form a coarse wavelength division multiplexing (CWDM) transmitter chip, several lasers each of a different wavelength are formed on the InP chip and an array of, for example, polymer photonic (PP) modulators are fabricated to align one to each laser. The output guides could be directed to a multiplexer, for example an echelle grating or ring resonator array (not shown), and the output of the multiplexer could be coupled to an optical fiber. In this example, 4×25 G modulators result in a 100 G transmitter chip or 8×50 G could be provided for a 400 G transmitter chip.

Figure 17:
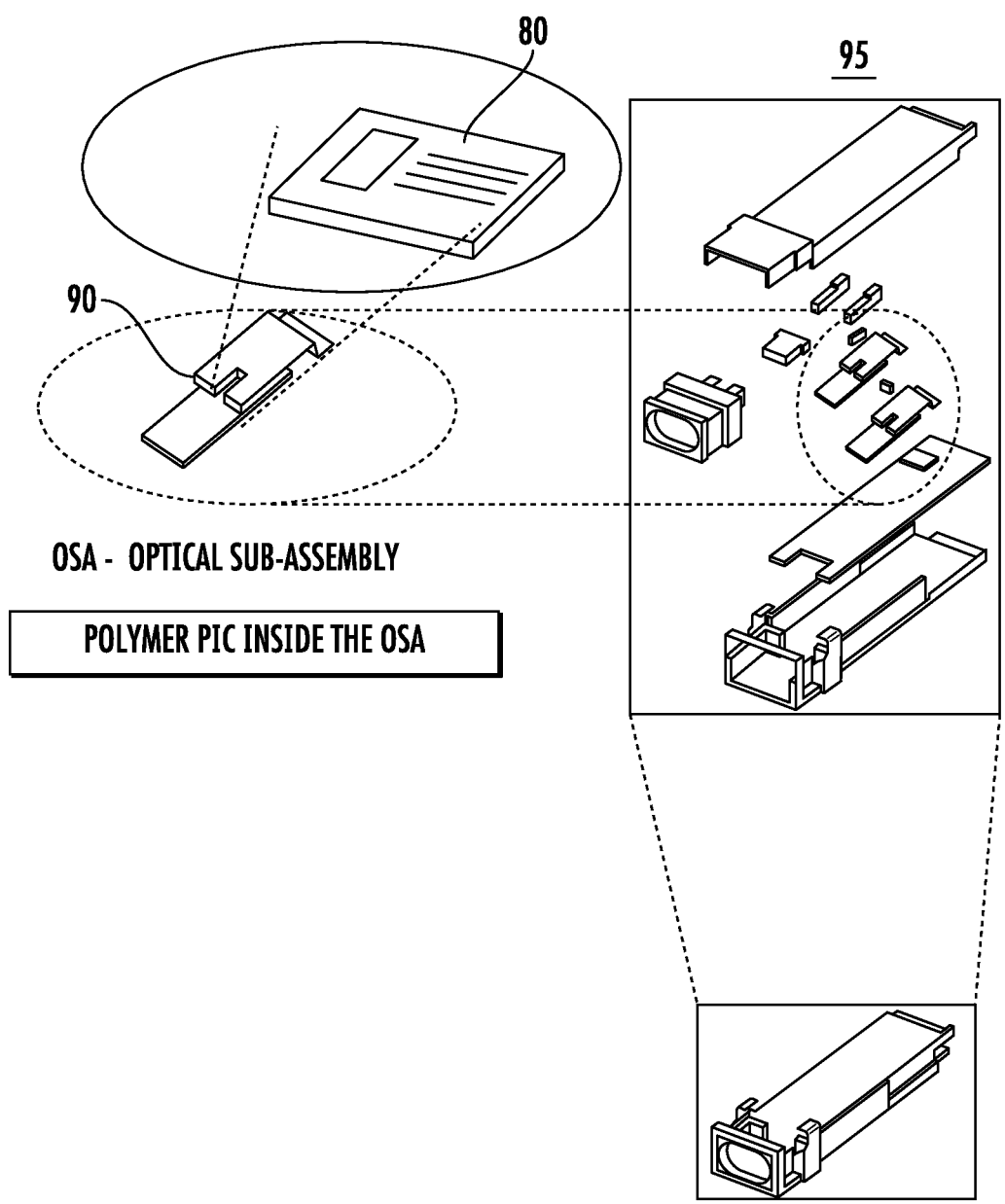
FIG. 17 is a simplified perspective view illustrating the array of lasers/polymer modulators of FIG. 16 assembled in a package module.

Referring additionally to FIG. 17, an example of a package for multiple DDPM structure 80 is illustrated. In this example, multiple DDPM structure 80 is mounted in an optical subassembly 90. Optical subassembly 90 is then mounted in a package module 95 designed around optical subassembly 90.

Thus, a new and improved direct-drive polymer modulator is disclosed. The direct-drive polymer modulator is smaller than prior-art modulators that required external rf drivers and can easily be integrated in an operating structure and/or on a common platform with semiconductor lasers and the like. The laser and polymer modulator can be integrated on a common platform with more efficient coupling between source laser and optical modulator. Efficient 3-layer direct- Having fully described the invention in such clear and concise terms as to enable those skilled in the art to understand and practice the same, the invention claimed is:

1. A direct-drive polymer modulator comprising:
   a platform formed of InP;
   a multilayer waveguide formed in/on the platform, the waveguide including a bottom cladding layer, an electro-optic polymer core and a top cladding layer;
   at least a portion of the waveguide forming a direct-drive polymer modulator;
   a top microstrip conductor overlying at least a portion of the direct-drive polymer modulator; and
   an electron blocking layer sandwiched between the top cladding layer and the top microstrip conductor overlying at least the portion of the direct-drive polymer modulator.

2. The direct-drive polymer modulator as claimed in claim 1 wherein the polymer modulator includes a Mach-Zehnder interferometer-type modulator.

3. The direct-drive polymer modulator as claimed in claim 1 wherein the multilayer waveguide has a propagation loss less than 2.2 dB/cm with device insertion loss less than 6 dB.

4. The direct-drive polymer modulator as claimed in claim 3 wherein the direct-drive polymer modulator and multilayer waveguide includes one of a ridge waveguide and an inverted-ridge waveguide.

5. The direct-drive polymer modulator as claimed in claim 1 wherein the direct-drive polymer modulator has a $V_\pi$ of approximately 0.5V.

6. A direct-drive polymer modulator comprising:
   a platform;
   a multilayer waveguide formed in/on the platform, the waveguide including a bottom cladding layer, an electro-optic polymer core and a top cladding layer, the bottom cladding layer and the top cladding layer each including electro-optic polymer; and
   at least a portion of the waveguide forming a direct-drive polymer modulator.

7. The direct-drive polymer modulator as claimed in claim 6 wherein the electro-optic polymer core has an electro-optic coefficient ($r_{33}$) greater than 250 pm/V, a Tg 150° C. to >200° C. and a resistivity approximately $10^8$ Ohm-cm, and the top and bottom electro-optic polymer cladding layers have a Tg approximately the same as the Tg of the electro-optic polymer core, and a resistivity, at room temperature, greater than approximately $10^8$ Ohm-cm, and a resistivity less than the resistivity of the electro-optic polymer core at poling temperature, and the top and bottom electro-optic polymer cladding layers have levels of conductivity equal to or higher than the electro-optic polymer core.

8. A direct-drive polymer modulator comprising:
   a platform;
   a multilayer waveguide formed in/on the platform, the multilayer waveguide including a bottom electro-optic polymer cladding layer, an electro-optic polymer core and a top electro-optic polymer cladding layer, the electro-optic polymer core having an electro-optic coefficient ($r_{33}$) greater than 250 pm/V, and a Tg 150° C. to >200° C., and the top and bottom electro-optic polymer cladding layers having a Tg approximately the same as the Tg of the electro-optic polymer core; and
   a direct-drive electro-optic polymer modulator formed in the multilayer waveguide.

9. The direct-drive polymer modulator as claimed in claim 8 wherein the platform includes InP.

10. The direct-drive polymer modulator as claimed in claim 8 wherein the direct-drive electro-optic polymer modulator and the multilayer waveguide includes metallization on a surface of the platform underlying the bottom electro-optic polymer cladding layer.

11. The direct-drive polymer modulator as claimed in claim 10 wherein the metallization on the surface of the platform underlying the bottom electro-optic polymer cladding layers includes one of Au, Ti/Au, Cr/Au, or Ti/Au/Ti.

12. The direct-drive polymer modulator as claimed in claim 8 further including a top microstrip conductor overlying at least a portion of the electro-optic polymer modulator.

13. The direct-drive polymer modulator as claimed in claim 12 further including an electron blocking layer sandwiched between the top electro-optic polymer cladding layer and the top microstrip conductor overlying at least the portion of the electro-optic polymer modulator.

14. The direct-drive polymer modulator as claimed in claim 12 wherein the multilayer waveguide has a propagation loss less than 2.2 dB/cm with device insertion loss less than 6 dB.

15. A method of fabricating a direct-drive polymer modulator comprising the steps of:
   providing a platform;
   depositing on the platform a bottom electro-optic polymer cladding layer, an electro-optic polymer core overlying the bottom electro-optic polymer cladding layer, and a top electro-optic polymer cladding layer overlying the electro-optic polymer core forming an electro-optic polymer waveguide, and forming the electro-optic polymer core from materials having an electro-optic coefficient ($r_{33}$) greater than 250 pm/V, a Tg 150° C. to >200° C. and a resistivity approximately $10^8$ Ohm-cm, and the top and bottom electro-optic polymer cladding layers have a Tg approximately the same as the Tg of the electro-optic polymer core, and a resistivity less than the resistivity of the electro-optic polymer core at poling temperature, and the top and bottom electro-optic polymer cladding layers have levels of conductivity equal to or higher than the electro-optic polymer core;
   forming an electro-optic polymer modulator in the electro-optic polymer waveguide.

16. The method of fabricating a direct-drive polymer modulator as claimed in claim 15 further including a step of depositing metallization on the platform prior to depositing the sequential layers of electro-optic material.

17. The method of fabricating a direct-drive polymer modulator as claimed in claim 16 wherein the step of depositing metallization on the platform includes depositing one of Au, Ti/Au, Cr/Au, or Ti/Au/Ti.

18. The method of fabricating a direct-drive polymer modulator as claimed in claim 17 further including a step of depositing a top microstrip conductor overlying at least a portion of the electro-optic polymer modulator and an electron blocking layer sandwiched between the top electro-optic polymer cladding layer and the top microstrip conductor overlying at least the portion of the electro-optic polymer modulator.

19. The method of fabricating a direct-drive polymer modulator as claimed in claim 18 wherein the step of forming an electro-optic polymer modulator includes incorporating one of a ridge waveguide and an inverted-ridge waveguide into the electro-optic polymer modulator.

20. The method of fabricating a direct-drive polymer modulator as claimed in claim 15 wherein the step of forming an electro-optic polymer modulator includes forming a Mach-Zehnder interferometer modulator.

* * * * *